July 29, 1941.  F. LEISTER  2,251,228
BEARING
Original Filed Aug. 24, 1936
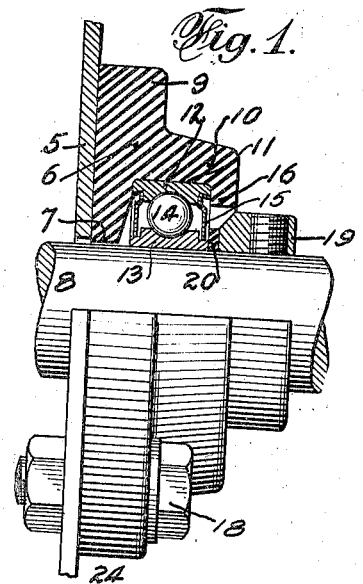
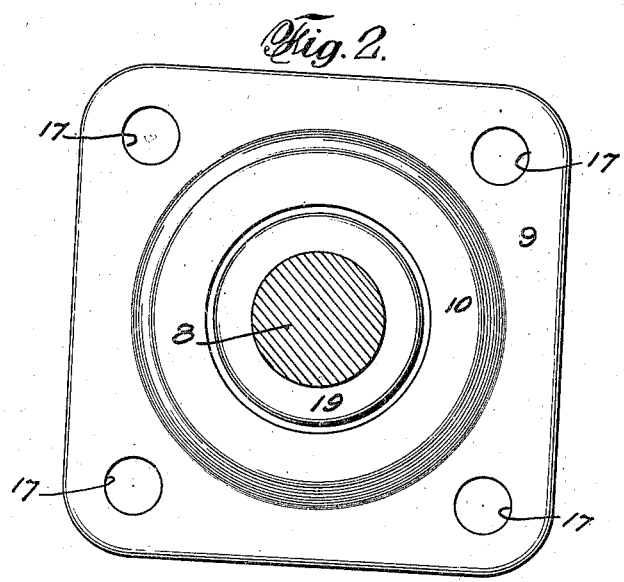
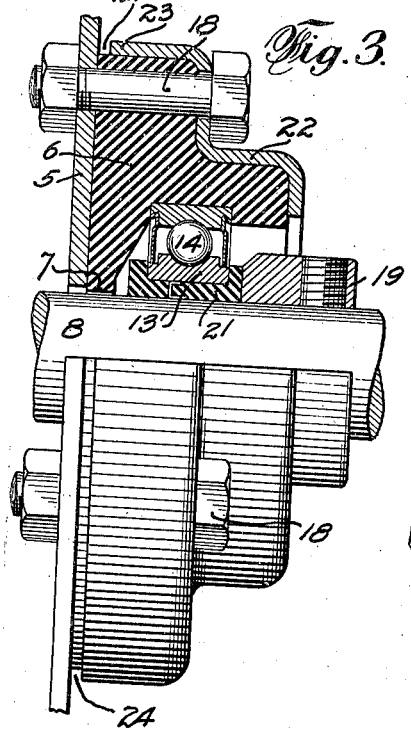
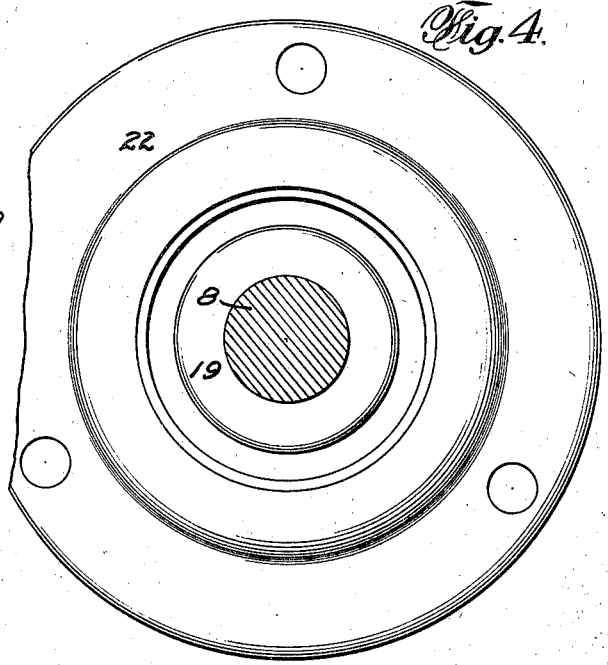
INVENTOR
FAYETTE LEISTER
BY
ATTORNEYS Patented July 29, 1941

2,251,228

UNITED STATES PATENT OFFICE 2,251,228

BEARING

Fayette Leister, Detroit, Mich., assignor to The Fafnir Bearing Company, New Britain, Conn., a corporation of Connecticut Original application August 24, 1936, Serial No. 97,485. Divided and this application October 27, 1938, Serial No. 237,185

1 Claim. (Cl. 308—184)

My invention relates to a bearing mounting and more particularly to a mounting for deadening bearing and other noises. This application is a division of my copending application, Serial No. 97,485, filed August 24, 1936, now matured into Patent No. 2,160,220, issued May 30, 1939.

It is an object of the invention to provide an improved form of sound-deadening bearing mounting, simple in construction, relatively cheap to manufacture, and effective in use.

It is another object to provide an improved form of sound-deadening bearing mounting having improved features to lengthen the life of the mounting and maintain its effectiveness over a long period.

Other objects and various features of the invention will be hereinafter pointed out or will become apparent to those skilled in the art.

In the drawing which shows, for illustrative purposes only, preferred forms of the invention—

Fig. 1 is an edge view in quarter section of a bearing mounting, illustrating features of the invention;

Fig. 2 is an axial or front view in elevation of the bearing mounting shown in Fig. 1;

Fig. 3 is a view similar to Fig. 1, illustrating a modification;

Fig. 4 is an axial or front elevation of the mounting shown in Fig. 3.

The invention is particularly though not exclusively adapted for embodiment in a flange type mounting for anti-friction bearings and will be so described.

In said drawing, 5 indicates a support for the bearing mounting. Such support may be part of a machine frame or could be a part of a unitary bearing mounting.

In the form illustrated in Figs. 1 and 2, the mounting includes a block 6 of sound-deadening material, preferably resilient rubber or the like. The block 6 in the form shown is adapted to fit flatwise against the support 5 and may be provided with a substantially central opening or passage 7 for a shaft 8 extending through the support 5. The block 6 preferably comprises a relatively thin marginal flange portion 9 and an upstanding or raised central portion or boss 10. The block is provided substantially centrally with a bearing receiving recess 11 coaxial with the opening 7. The bearing receiving recess is of a size to receive and hold an anti-friction bearing, including an outer bearing ring 12, an inner bearing ring 13, and interposed anti-friction bearing members such as balls 14. If desired, conventional seal plates 15—15 may serve to retain lubricant in the bearing and exclude foreign matter. The block 6 at the side opposite the base portion may have an inturned flange 16 defining the recess 11 so that the outer ring 12 may be securely held in both axial directions as well as radially in the bearing receiving recess.

The bearing mounting is held to the support 5 in such a manner as to leave the portion thereof carrying the bearing relatively free to flex and give under operating conditions. In the marginal flange portion 9, I may provide a plurality of bolt holes 17—17, four being shown. The bolt holes are in the marginal or flange portion 9 and the bolts, such as 18, extending through the bolt holes are free of the main body of the block so that when the bolts are drawn up to secure the flange or foot portion 9 to the support, the main body of the block is left relatively free to flex and give under operating conditions. The bolts 18 of course compress the marginal portion 9 but the main body of the block is not substantially compressed by the securing bolts and the life of the rubber, when the block is formed of rubber, is substantially prolonged. The shaft 7 is of a size to be received in the inner bearing ring 13 and the inner ring is held to the shaft by any suitable means such as a set collar 19 and interposed rubber ring or gasket 20.

In the form shown in Figs. 3 and 4, most parts may be substantially the same as those heretofore described and the same reference characters have been applied thereto. Instead of mounting the inner ring 13' of the anti-friction bearing directly upon the shaft 8, the inner ring may be, if desired, carried by a channeled annular rubber or similar ring 21 and the set collar 19 may abut one leg of the channel 21. The block 16 in the form shown in Figs. 3 and 4 is held to the support 5 in a different manner and produces a mounting having different characteristics. In the form illustrated I employ a sheet metal backing or cover cap 22 for the face of the block and the sheet metal cover cap 22 may conform substantially to the shape of the face of the block, as illustrated. The cover cap 22 embodies means preferably in the form of the marginal flange 23 to limit the degree of compression of the block 6 when the same is secured to the support 5. As illustrated, the flange 23 is spaced as indicated in slightly exaggerated fashion at 24 from the support 5 so that when the bolts 18 are drawn up the cover cap will be drawn toward the support and the engagement of the flange 23 with the support will limit the degree of compression of the block 6. Thus a careless or inexperienced workman cannot overstress the material of the block when securing the same to the support 5. The mounting shown in Figs. 3 and 4 will be substantially firmer and to a considerable extent less yielding than the form shown in Figs. 1 and 2. However, both forms will serve to very substantially deaden bearing and other noises incident to the operation of a machine or device in connection with which the bearing mounting is employed.

While the invention has been described in considerable detail and preferred forms illustrated, it is to be understood that various changes and modifications may be made within the scope of the invention as defined in the appended claim.

I claim:

In a device of the character indicated, a bearing mounting including a block of sound-deadening material to fit against a support, said block having a substantially centrally disposed bearing receiving recess therein the axis of which extends at substantially right angles to the support, an anti-friction bearing mounted in said recess, said bearing including an outer bearing ring circumferentially fitting in said recess, an inner bearing ring and interposed anti-friction bearing members, said block having a generally radially inwardly extending flange to fit against the support and defining one end of said recess and extending inwardly to a point adjacent the bore through said inner bearing ring, said block having a generally radially inwardly extending flange defining the opposite end of said recess and extending inwardly so as to merely confine the outer bearing ring in said recess, said last mentioned flange being deformable to readily admit the anti-friction bearing to be assembled with the block, and means for securing said block to a support.

FAYETTE LEISTER.